United States Patent
Gabura (10) Patent No.: US 8,432,433 B2
(45) Date of Patent: Apr. 30, 2013

(54) METHOD AND APPARATUS FOR COLORIZING A MONOCHROME INFRARED IMAGE

(75) Inventor: Andrew James Gabura, Midland (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 642 days.

(21) Appl. No.: 12/687,379

(22) Filed: Jan. 14, 2010

(65) Prior Publication Data
US 2011/0169911 A1    Jul. 14, 2011

(51) Int. Cl.
H04N 9/43 (2006.01)

(52) U.S. Cl.
USPC ................................ 348/34; 348/33

(58) Field of Classification Search ............ 348/33, 348/34
See application file for complete search history.

(56) References Cited

U.S. PATENT DOCUMENTS
2010/0002956 A1 * 1/2010 Hogervorst et al. .......... 382/284

FOREIGN PATENT DOCUMENTS
EP    1 887 785 A1    2/2008

OTHER PUBLICATIONS

"Colorizing single band intensified nightvision images" to Toet.*
Natural colour mapping for multiband nightvision imagery to Alexander Toet.*
Real-time Color Night-vision for Visible and Thermal images, Gu et al. IITA Workshops 2008.*
"Method for applying daytime colors to nighttime imagery in realtime", Hogervorst, SPIE 2008.*
Toet, "Colorizing single band intensified nightvision images," *Displays* 26 (2005), pp. 15-21.
Toet, "Natural colour mapping for multiband nightvision imagery," *Information Fusion* 4 (2003), pp. 155-166.
Welsh, et al., "Transferring Color to Greyscale Images," 4 pages, undated.
Reinhard, et al., "Color Transfer between Images," IEEE Computer Graphics and Applications, Sep./Oct. 2001, pp. 34-41.
Toet, "Own the Night with Flying Colors: Towards Ergonomic Full Color Multiband Night Vision Systems," NATO OTAN, RTO-MP-HFM-141, pp. 14-1 through 14-30, undated.

* cited by examiner

*Primary Examiner* — Mehrdad Dastouri
*Assistant Examiner* — Mohammed Rahaman
(74) *Attorney, Agent, or Firm* — Lando & Anastasi, LLP (57) ABSTRACT

A method and apparatus involve electronically transforming a monochromatic infrared source image of a source scene into a natural daylight color image of the source scene as a function of reference information, the only information derived from the source scene and utilized in the transforming being the monochromatic infrared source image. According to a different aspect, an apparatus includes an infrared image detector that provides a monochromatic infrared source image of a source scene, and includes a transformation section that transforms the monochromatic infrared source image into a natural daylight color image of the source scene as a function of reference information, the only information derived from the source scene and utilized in the transforming being the monochromatic infrared source image.

21 Claims, 6 Drawing Sheets

METHOD AND APPARATUS FOR COLORIZING A MONOCHROME INFRARED IMAGE

FIELD OF THE INVENTION

This invention relates in general to colorization of images and, more particularly, to colorization of infrared images.

BACKGROUND

In a situation involving night visibility, or seeing through fog and smoke, it may be difficult or impossible to generate a useful image in the visible light range. Moreover, even if a visible light image is generated under such circumstances, it is often a low-contrast image, in which details are hard to identify.

In contrast, infrared (IR) imagery is very useful for enhanced night visibility, and/or for seeing through fog and smoke. However, the interpretation of IR images is inherently unintuitive, because the IR luminances of real-world objects are significantly different from what the human eye is normally used to seeing in the visible light range. It would be easier to interpret IR images if the IR color scheme was mapped into natural daylight coloring. However, in the case of a single-band IR image, it has previously been believed that such an image does not contain sufficient information to permit colorization thereof in a manner yielding a natural daylight color image in which the colorization is reasonably accurate.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
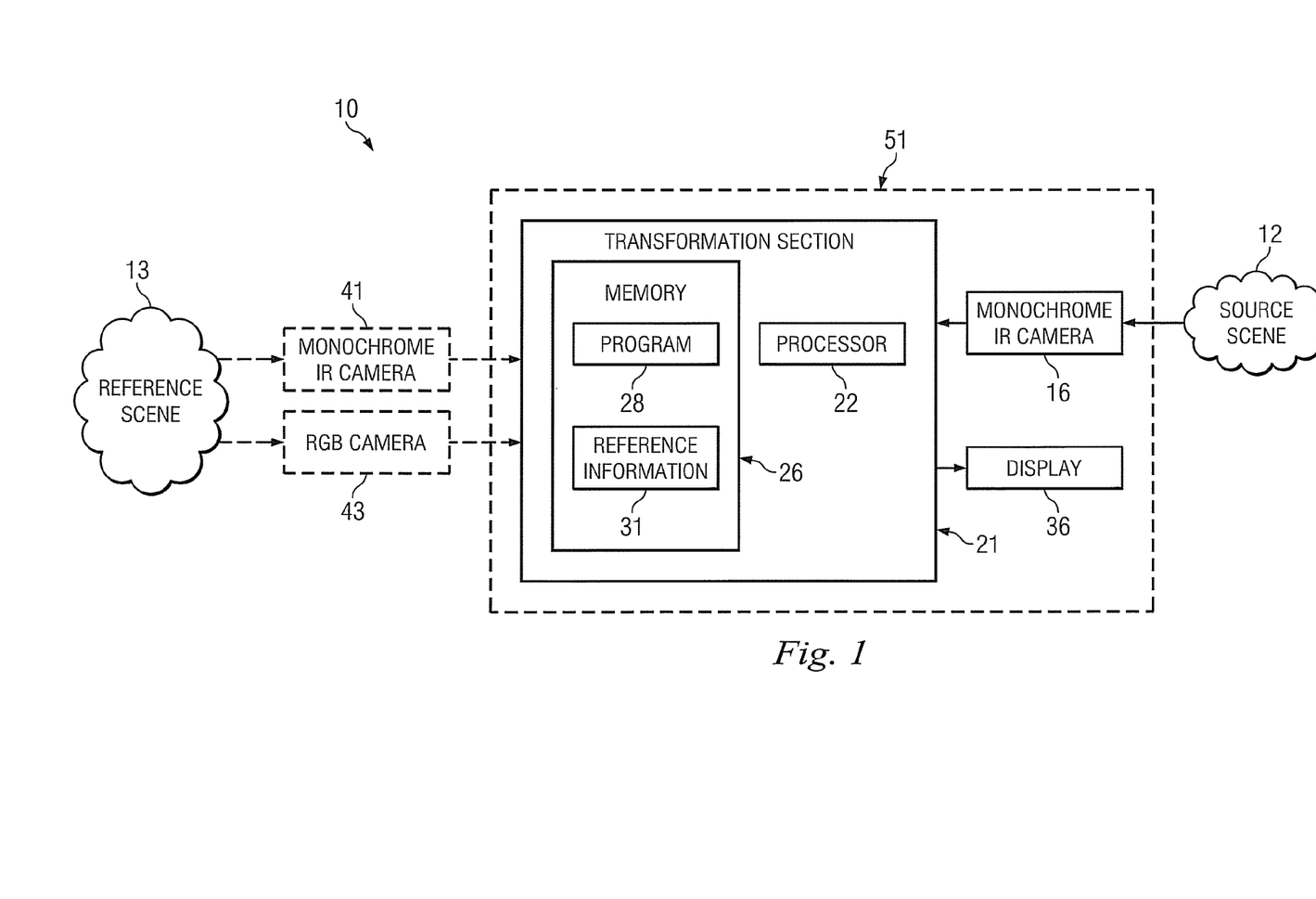
FIG. 1 is a block diagram of an apparatus that can colorize a monochrome infrared image of a source scene using reference information derived from a reference scene.
Figure 2:
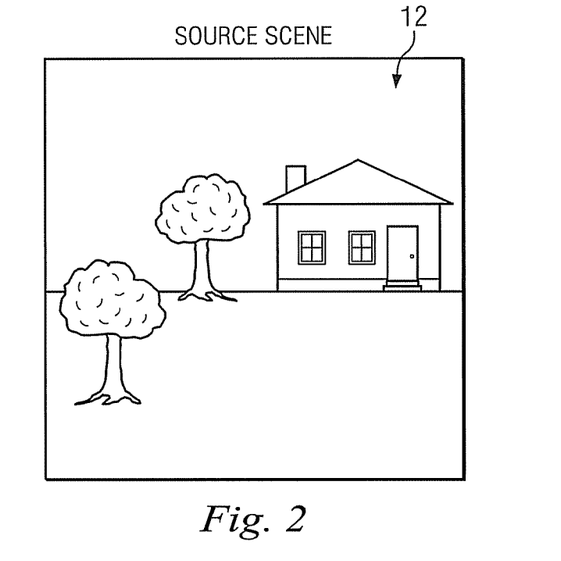
FIG. 2 is a diagrammatic view of an example of a source scene.
Figure 3:
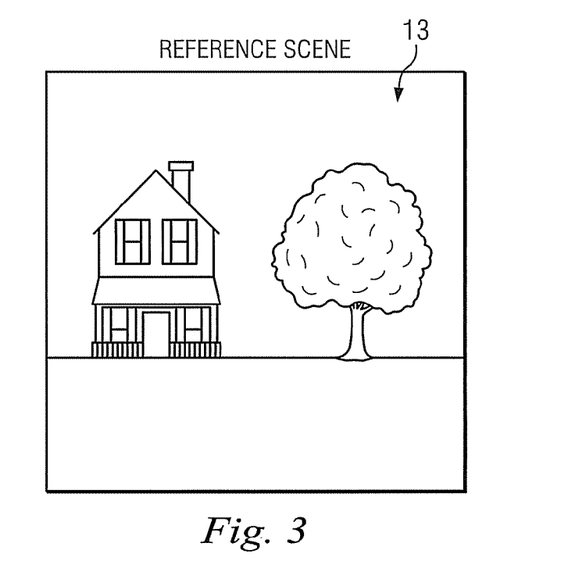
FIG. 3 is a diagrammatic view of an example of a reference scene corresponding to the source scene of FIG. 2.

FIG. 1 is a block diagram of an apparatus 10 that can colorize a monochrome infrared (IR) image of a source scene 12 using reference information derived from a reference scene 13. The source scene 12 and the reference scene 13 are similar but different. In this regard, FIG. 2 is a diagrammatic view of an example of a source scene 12, and FIG. 3 is a diagrammatic view of an example of a corresponding reference scene 13. The scenes 12 and 13 in FIGS. 2 and 3 are different (in that they are not identical), but they are also similar (in that they each include a yard with grass, a building, and at least one tree).

In FIG. 1, the apparatus 10 includes a monochrome IR camera or image detector 16 that can produce a monochromatic IR source image of the source scene 12. The camera 16 is a device of a type known in the art, and is therefore not illustrated and described here in further detail. In the disclosed embodiment, the camera 16 is a single-band IR camera that is responsive to IR radiation in only one of the near IR band, the intermediate IR band, and the far IR band.

The apparatus 10 includes a transformation section 21 that receives and processes images from the camera 16. The transformation section 21 includes computer hardware in the form of a conventional and commercially-available computer system of the type commonly known as a personal computer. For example, the hardware could be a personal computer obtained commercially from Dell Inc. of Round Rock, Tex. Alternatively, the hardware of the transformation section 21 could be a microcontroller of a known type, or any other suitable hardware configuration.

The transformation section 21 includes a processor 22 of a known type. For example, the processor 22 could be a device that is commercially available under the tradename CORE™ 2 Duo from Intel Corporation of Santa Clara, Calif. Alternatively, the processor 22 could be implemented using an appropriately-configured, field-programmable gate array (FPGA). For example, the FPGA could be an IGLOO® Nano available commercially from Actel Corporation of Mountain View, Calif., or alternatively a Cyclone® III LS available commercially from Altera Corporation of San Jose, Calif. In the disclosed embodiment, the transformation section 21 also includes a memory 26 that is shown diagrammatically in FIG. 1, in that it collectively represents several different types of memory that happen to be present. For example, the memory 26 may include any or all of a hard disk drive (HDD), a volatile random access memory (RAM), a "flash" RAM, a read-only memory (ROM), or any other type of memory component suitable for use within the transformation section 21. The memory 26 stores a computer program 28 that is executed by the processor 22, and that causes the transformation section 21 to operate in a manner described in more detail later. The memory 26 also stores data, including reference information 31 that is used by the program 28 to colorize monochrome IR images from the camera 16, in a manner described in more detail later.

The apparatus 10 includes a display 36 of a well-known type. The display 36 can receive an image from the transformation section 21, and then display that image. For example, the transformation section 21 can (1) receive from the camera 16 a monochrome IR source image of the source scene 12, (2) colorize that image to produce a natural daylight color image of the source scene, and then (3) supply the colorized image to the display 36, where it is displayed.

The apparatus 10 also includes a further monochrome IR camera or image detector 41, and an RGB (red, green, blue) color camera or image detector 43 that is responsive to visible light. The cameras 41 and 43 are optional, and are shown in FIG. 1 for purposes of completeness. In the disclosed embodiment, the monochrome IR camera 41 is identical to the camera 16. In fact, the camera 16 could optionally perform dual duty, and provide an image of the source scene 12 and also an image of the reference scene 13. However, for clarity, FIG. 1 shows two separate cameras at 16 and 41. Although the camera 41 in FIG. 1 is identical to the camera 16, it would alternatively be possible to use any suitable camera at 41. The RGB camera 43 is also a camera of a known type, and produces a natural daylight color image of the reference scene 13.

The cameras 41 and 43 are configured to produce images that are registered with respect to each other. For purposes of this disclosure, the term "registered" means (1) that an image from the camera 41 and a corresponding image from the camera 43 each have the same number of pixels both vertically and horizontally, and (2) that each pixel in one image represents exactly the same portion of the reference scene 13 as the corresponding pixel in the other image. Images from the cameras 41 and 43 are used to generate the reference information 31, in a manner described later.

The cameras 41 and 43 are shown in broken lines in FIG. 1 because, as mentioned above, they may or may not be part of the apparatus 10. If the cameras 41 and 43 are present in the apparatus 10, then the transformation section 21 can use images from these cameras to generate the reference information 31, in a manner described later. On the other hand, the cameras 41 and 43 could alternatively be coupled to some other not-illustrated computer system that generates the reference information 31, and then the reference information 31 could be transferred from that other computer system to the memory 26 in the transformation section 21 in any suitable manner, for example through a computer network, or using a portable memory device such as a Universal Serial Bus (USB) drive.

A portion of the apparatus 10 is designated by a broken line 51. This portion of the apparatus 10 could be incorporated into a device such as a weapon sight, or a night vision aid. This device would take a monochrome IR image of a source scene (for example when visible light is low, or when smoke or fog is present), and then colorize and display that image so that a user sees a natural daylight color image. Previously, it was believed that a single-band IR image of the type produced by camera 16 does not contain sufficient information to permit colorization thereof in a manner yielding a natural daylight color image with reasonably accurate colors. However, as discussed in more detail below, the apparatus 10 is capable of doing this, and in particular is capable colorizing a single-band IR image of the type produced by camera 16 in a manner yielding a natural daylight color image with relatively accurate colors.

Figure 4:
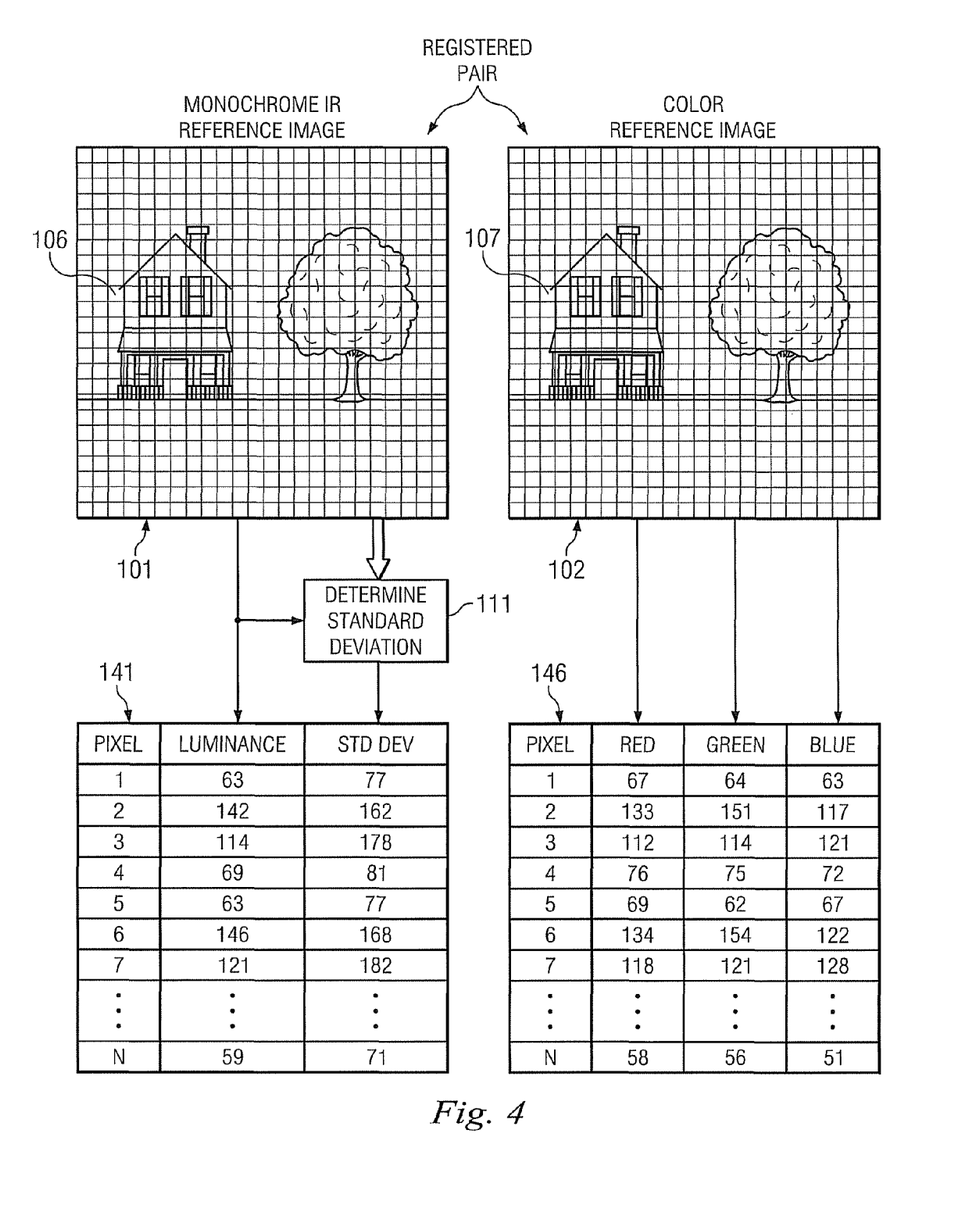
FIG. 4 is a diagram showing how a transformation section in the apparatus of FIG. 1 can generate the reference information from an infrared reference image and a color reference image that represents the reference scene of FIG. 3.

FIG. 4 is a diagram showing how images from the cameras 41 and 43 (FIG. 1) are used by the transformation section 21 to generate the reference information 31. In more detail, FIG. 4 shows at 101 a monochrome IR reference image produced by the camera 41, and shows at 102 a color reference image produced by the camera 43. The images 101 and 102 each represent the same scene (shown in FIG. 3), except that image 101 is a single-band IR image, and image 102 is a visible-light color image. In FIG. 4, each of the images 101 and 102 is depicted as an array of 24×24 pixels, but the 24×24 array of pixels is used here for simplicity and clarity. The actual number of pixels could be higher or lower, and would typically be much higher. As received from the camera 41, each pixel in the image 101 has a respective luminance value associated with it.

The two images 101 and 102 are registered with respect to each other. As discussed earlier, this means (1) that the images 101 and 102 have the same number of pixels horizontally and the same number of pixels vertically, and (2) that each pixel in the image 101 represents the same portion of the reference scene 13 as the corresponding pixel in the image 102. As one example, image 101 has a pixel 106 that represents an end portion of a building roof, and image 102 has a corresponding pixel 107 that represents the same portion of the building roof.

Figure 5:
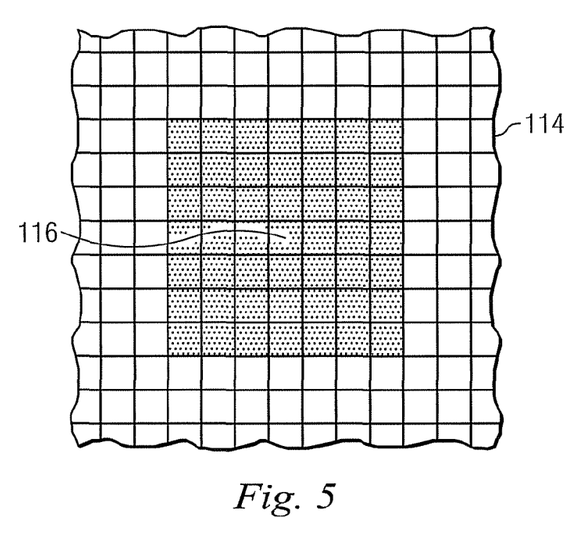
FIGS. 5, 6 and 7 are each a diagrammatic view showing, in an enlarged scale, a respective portion of the infrared reference image of FIG. 4.

As indicated diagrammatically by a block 111 in FIG. 4, the computer program 28 (FIG. 1) determines, for each pixel in image 101, a standard deviation value. In this regard, FIG. 5 is a diagrammatic view showing a portion 114 of the image 101. For an arbitrary pixel 116, the block 111 determines a standard deviation value for that pixel using a 7×7 array of pixels, where the pixel 116 is at the center of the array. Although the discussion here is based on use of a 7×7 array of pixels, it would alternatively be possible to determine standard deviation using some other configuration of pixels in the neighborhood of the pixel of interest.

In FIG. 5, stippling is used to identify the 49 pixels in the 7×7 array for pixel 116. Each of these 49 pixels has a respective luminance value. The computer program 28 takes the 49 luminance values for these 49 pixels, and determines a standard deviation for these values (based on the standard mathematical definition for standard deviation).

Figure 6:
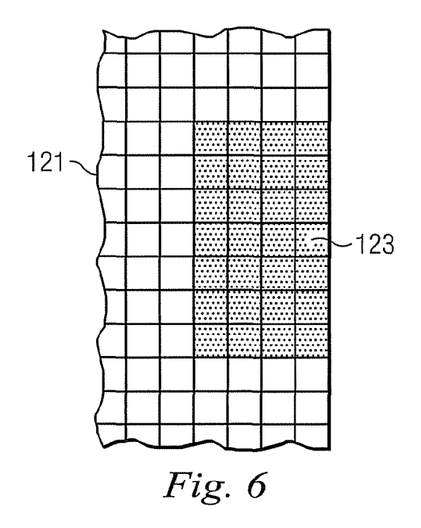
Figure 7:
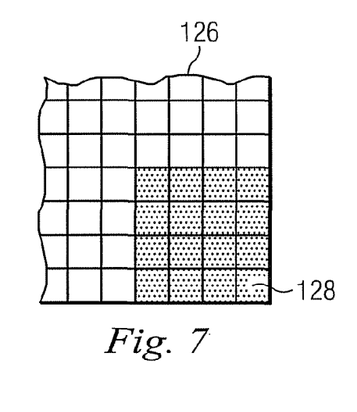

It will be recognized that, for some pixels located near an edge of the image 101, the standard deviation will be determined by less than a 7×7 array of pixels. For example, FIG. 6 is a diagrammatic view of a portion 121 of the image 101, where a pixel 123 is located along one edge of the image. The standard deviation value for the pixel 123 is determined using a 4×7 array of pixels that is designated by stippling in FIG. 6. Similarly, FIG. 7 is a diagrammatic view of a portion 126 of the image 101, where a pixel 128 is located in a corner of the image. The standard deviation value for the pixel 128 will be determined using a 4×4 array of pixels that is designated by stippling in FIG. 7. In this manner, a respective standard deviation value is determined for each of the pixels in the IR reference image 101 (FIG. 4).

Referring again to FIG. 4, the computer program 28 generates a table 141 having N rows, where N is the total number of pixels in the image 101, and where each row in the table corresponds to a respective pixel. For each pixel in the image 101, the corresponding row of the table is populated with (1) the original luminance value for that pixel, and (2) the standard deviation value (STD DEV) calculated for that pixel in block 111.

The computer program 28 generates a second table 146 that also has N rows, each corresponding to a respective pixel in the image 102. Each row in table 146 contains the red value, the green value and the blue value for the pixel from RGB image 102 that is associated with the row.

After generating the two tables 141 and 146, the computer program 28 scans the table 141, looking for two rows that happen to have identical luminance and standard deviation values. For example, it will be noted in FIG. 4 that rows 1 and 5 (representing pixels 1 and 5) each have a luminance value of 63 and a standard deviation value of 77. In the other table 146, the computer program 28 (1) averages the two red values in rows 1 and 5, (2) averages the green values in these two rows, (3) averages the blue values in these rows, (4) inserts these three average values into one of the two rows, and then (5) deletes the other of these rows. For example, the computer program 28 could take the red values of 67 and 69 for rows 1 and 5, average them to obtain an average value 68, and then substitute this average value 68 for the original value 67 in row 1. In a similar manner, the program could calculate an average green value of 63 and substitute this into row 1, and calculate an average blue value of 65 and substitute this into row 1. The program 28 could then delete row 5 from each of the tables 141 and 146.

Alternatively, it would be possible to use other methods of averaging the color values in rows 1 and 5 of table 146, with the aim of improving the naturalness of the result. For example, the red, green and blue values could be transformed into a uniform perceptual color space, and then averaged there. If color averaging is done in an alternate color space, then the resulting color information must be transformed from that space back into its corresponding red, green and blue values for use in the table 146.

Figure 8:
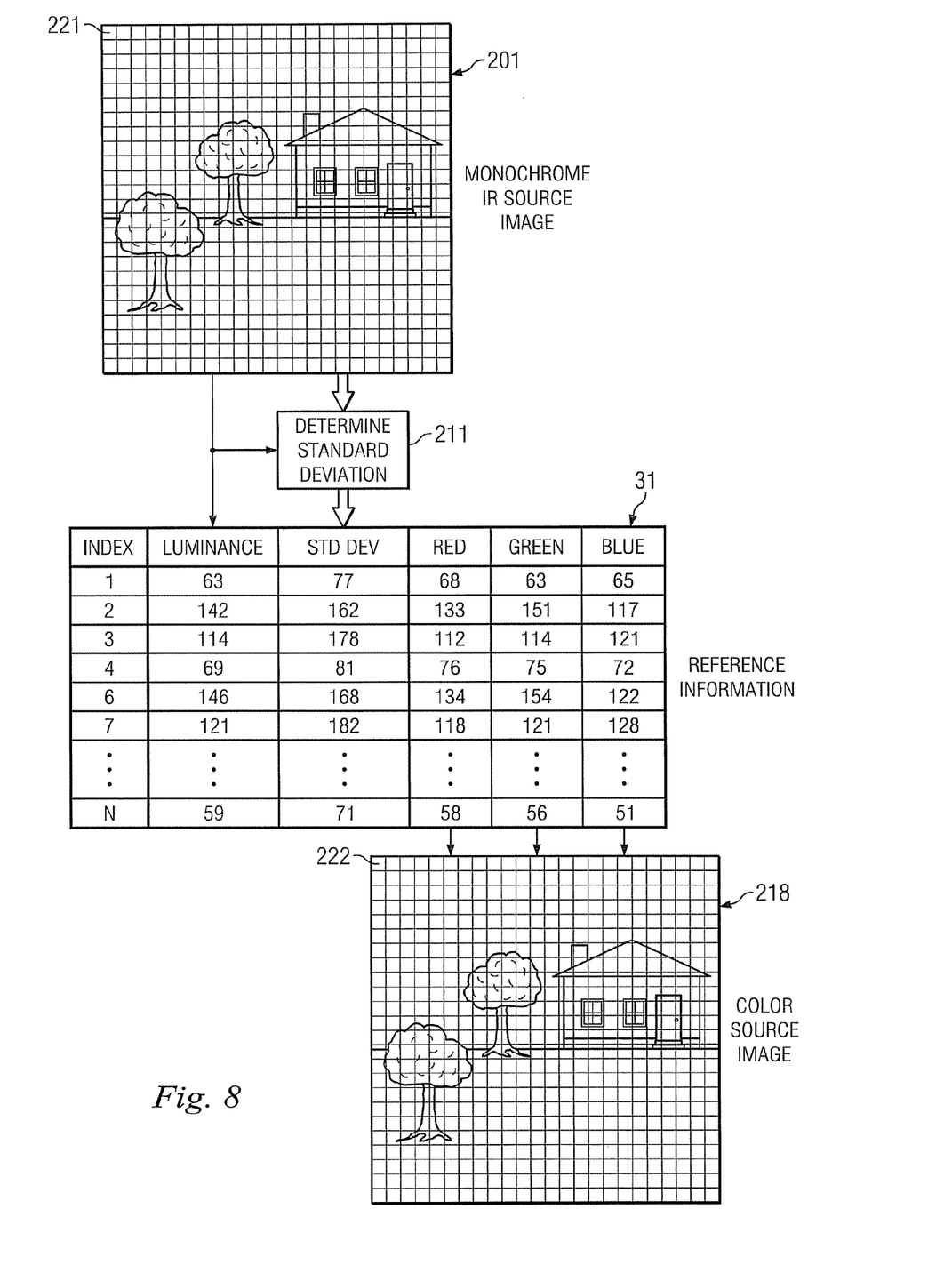
FIG. 8 is a diagram showing how the transformation section in the apparatus of FIG. 1 utilizes the reference information to colorize a monochrome infrared source image representing the source scene of FIG. 2.

FIG. 8 is a diagram showing how the computer program 28 in the transformation section 21 of FIG. 1 utilizes the reference information 31 to colorize a monochrome IR image from the camera 16. In FIG. 8, reference numeral 201 designates a monochrome IR source image that has been produced by the camera 16, and that represents the source scene 12 of FIG. 2. In FIG. 8, the image 201 is shown as an array of 24×24 pixels, but this is merely for simplicity and clarity. The actual number of pixels could be higher or lower, and would typically be much higher. As discussed earlier, the reference images 101 and 102 in FIG. 4 are registered, and must have the same number of pixels. However, the source image 201 does not need to have the same number of pixels as the reference images 101 and 102, and could have a larger or smaller number of pixels.

As indicated diagrammatically by a block 211 in FIG. 8, the computer program 28 calculates a respective standard deviation value for each pixel in the source image 201. This calculation is carried out in the same manner described above for block 111.

One specific example of the reference information 31 from FIG. 1 is shown in more detail at the center of FIG. 8. It will be noted that the tables 141 and 146 from the bottom of FIG. 4 have been merged into a single table that serves as the reference information 31. It will also be noted that, as described above, row 5 is no longer present, and the red, green and blue values in row 1 are each an average of the original values from rows 1 and 5. Due in part to the fact that the values for some pixels have been combined, the left column of the table is labeled "index" rather than "pixel".

The computer program 28 uses the reference information 31 to colorize the monochrome IR source image 201, in order to thereby generate a corresponding color source image 218. The color source image 218 has the same number of pixels as the IR source image 221, both vertically and horizontally. The colorization process is carried out in the following manner. The computer program 28 takes a pixel 221, and determines a standard deviation value for that pixel at 211, based on luminance values for the pixel 221 and several neighboring pixels. The computer program takes the luminance value and the calculated standard deviation value for that pixel 221, and searches the reference information 31 for a row with either an exact match or, in the absence of an exact match, the closest match. The computer program then takes the red, green and blue values from that row, and assigns them to the corresponding pixel 222 in the color source image 218. The computer program then repeats this process for each of the other pixels in the image 201. The process shown in FIG. 8 is a fast and compact technique for colorizing a monochrome IR image.

Figure 9:
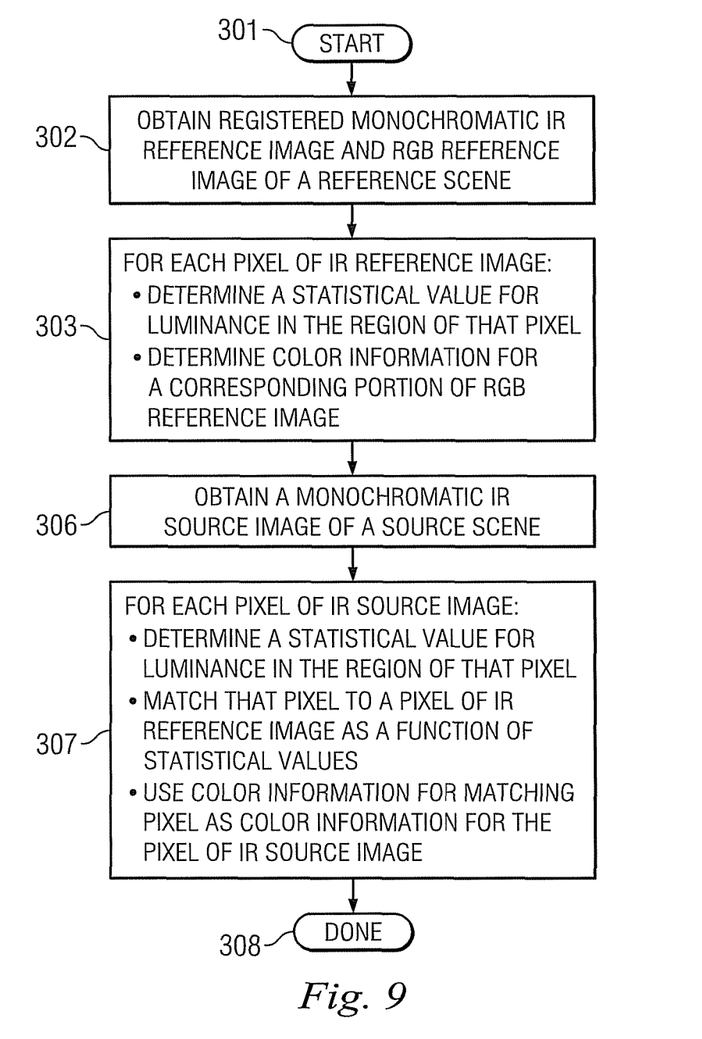
FIG. 9 is a high-level flowchart showing a colorization process that is described in association with FIGS. 4 and 8.

FIG. 9 is a high-level flowchart showing the process that was described above in association with FIGS. 4 and 8. This process begins at block 301 and proceeds to block 302, where the registered monochrome IR reference image 101 and color reference image 102 are obtained for a reference scene 13. Then, in block 303, for each pixel of the IR reference image 101, a determination is made at ill (FIG. 4) of a statistical value for luminance in the region of that pixel. Color information is then determined for a corresponding portion of the color reference image 102. For each pixel, this information is used to populate a respective row in each of the tables 141 and 146 (FIG. 4).

In block 306, the monochrome IR source image 201 (FIG. 8) is generated for a source scene. Then, in block 307, for each pixel of the IR source image 201, a determination is made of a statistical value for luminance in the region of that pixel. The luminance and statistical value for that pixel are then matched as closely as possible to the luminance and statistical value for a pixel of the IR reference image 101. Then, the color information that was derived from the color reference image 102 and that is associated with the matching pixel is used as the color information for a corresponding pixel of the color source image 218. The process of FIG. 9 then concludes at block 308.

Although a selected embodiment has been illustrated and described in detail, it should be understood that a variety of substitutions and alterations are possible without departing from the spirit and scope of the present invention, as defined by the claims that follow.

What is claimed is:

1. A method for color transformation, the method comprising:

electronically transforming a monochromatic infrared source image of a source scene into a natural daylight color image of said source scene as a function of reference information, wherein the only information derived from said source scene and utilized in said transforming being said monochromatic infrared source image, wherein said electronically transforming includes:

accessing a pair of reference images of a reference scene, wherein said pair of reference images includes a monochromatic infrared reference image of said reference scene and a natural daylight color reference image of said reference scene, wherein pixels from said monochromatic infrared reference image are co-located with pixels from said natural daylight color reference image;

matching luminance values from pixels in said monochromatic infrared source image to luminance values associated with pixels in said monochromatic infrared reference image; and assigning color values to said pixels in said monochromatic infrared source image from color values associated with said pixels in said natural daylight color reference image based on a mapping from said pixels in said natural daylight, color reference image to pixels in said monochromatic infrared reference image and said matching between said pixels in said monochromatic infrared reference image to said pixels in said monochromatic infrared source image to generate said natural daylight color image of said source scene.

2. The method according to claim 1, including maintaining as said reference information a plurality of statistical values that are each a statistical variance of luminance in the vicinity of a respective one of a plurality of first pixels from a first image that is said monochromatic infrared reference image of said reference scene that is different from but similar to said source scene, each of said statistical values having associated therewith color information from a portion of a second image corresponding to that first pixel where the second image corresponds to said first image and is said natural daylight color reference image of said reference scene;

wherein said source image includes a plurality of second pixels; and wherein said transforming includes for each said second pixel:

determining a respective statistical value that is a statistical variance of luminance in the vicinity of that second pixel;
wherein said matching includes matching that second pixel to one of said first pixels as a function of said statistical value for that second pixel and said statistical values for said first pixels; and
wherein said assigning includes utilizing said color information associated with the matching first pixel as color information for a respective pixel in said natural daylight color image corresponding to that second pixel.

3. The method according to claim 1, including creating said reference information before said transforming by:
obtaining corresponding first and second images of said reference scene that is different from but similar to said source scene, said first image being said monochromatic infrared reference image having a plurality of first pixels and said second image being said natural daylight color reference image;
determining for each of said first pixels a respective statistical value that is a statistical variance of luminance in the vicinity of that first pixel; and
associating with said statistical value for each said first pixel color information for a portion of said second image corresponding to that first pixel; wherein said source image includes a plurality of second pixels; and
wherein said transforming includes for each said second pixel:
determining a respective statistical value that is a statistical variance of luminance in the vicinity of that second pixel;
wherein said matching includes matching that second pixel to one of said first pixels as a function of said statistical value for that second pixel and said statistical values for said first pixels; and
wherein said assigning includes utilizing said color information associated with the matching first pixel as color information for a respective pixel in said natural daylight color image corresponding to that second pixel.

4. The method according to claim 3, including utilizing as said first pixels all of the pixels in said first image.

5. The method according to claim 3, including utilizing as said color information for each said portion of said second image a red value, a green value and a blue value.

6. The method according to claim 3, wherein for each said second pixel said matching is carried out as a function of a luminance value for that second pixel and respective luminance values for each of said first pixels.

7. The method according to claim 3, wherein said determining of said statistical value for each said second pixel includes determining a standard deviation of luminance values for a plurality of said second pixels; and wherein said determining of said statistical value for each said first pixel includes determining a standard deviation of luminance values for a plurality of said first pixels.

8. The method according to claim 3, wherein said obtaining of said first and second images includes configuring said first and second images to be registered images.

9. The method according to claim 1, including generating said monochromatic infrared source image so as to include infrared information from only one of the near infrared band, the intermediate infrared band, and the far infrared band.

10. An apparatus comprising a non-transitory computer-readable storage structure storing a computer program that, when executed, carries out:
transforming a monochromatic infrared source image of a source scene into a natural daylight color image of said source scene as a function of reference information, the only information derived from said source scene and utilized in said transforming being said monochromatic infrared source image, including:
accessing a pair of reference images of a reference scene, wherein said pair of reference images includes a monochromatic infrared reference image of said reference scene and a natural daylight, color reference image of said reference scene, wherein pixels from said monochromatic infrared reference image are co-located with pixels from said, natural daylight color reference image;
matching luminance values from pixels in said monochromatic infrared source image to luminance values associated with pixels in said monochromatic infrared reference image; and
assigning color values to said pixels in said monochromatic infrared source image from color values associated with said pixels in said natural daylight color reference image based on a mapping from said pixels in said natural daylight color reference image to said pixels in said monochromatic infrared reference image and said matching between said pixels in said monochromatic infrared reference image to said pixels in said monochromatic infrared source image to generate said natural daylight color image of said source scene.

11. The apparatus according to claim 10, wherein when executed said computer program further carries out:
maintaining as said reference information a plurality of statistical values that are each a statistical variance of luminance in the vicinity of a respective one of a plurality of first pixels from a first image that is said monochromatic infrared reference image of said reference scene that is different from but similar to said source scene, each of said statistical values having associated therewith color information from a portion of a second image corresponding to that first pixel, where the second image corresponds to said first image and is said natural daylight color reference image of said reference scene;
wherein said source image includes a plurality of second pixels; and
wherein when executed said computer program carries out said transforming in a manner that includes for each said second pixel:
determining a respective statistical value that is a statistical variance of luminance in the vicinity of that second pixel;
wherein said matching includes matching that second pixel to one of said first pixels as a function of said statistical value for that second pixel and said statistical values for said first pixels; and
wherein said assigning includes utilizing said color information associated with the matching first pixel as color information for a respective pixel in said natural daylight color image corresponding to that second pixel.

12. The apparatus according to claim 10 when executed said computer program further carries out:
obtaining corresponding first and second images of said reference scene that is different, from but similar to said source scene, said first image being said monochromatic infrared reference image having a plurality of first pixels and said second image being said natural daylight color reference image;
determining for each of said first pixels a respective statistical value that is a statistical variance of luminance in the vicinity of that first pixel; and associating with said statistical value for each said first pixel color information for a portion of said second image corresponding to that first pixel;
wherein said source image includes a plurality of second pixels; and
wherein when executed said computer program carries out said transforming in a manner that includes for each said second pixel:
determining a respective statistical value that is a statistical variance of luminance in the vicinity of that second pixel;
wherein said matching includes matching that second pixel to one of said first pixels as a function of said statistical value for that second pixel and said statistical values for said first pixels; and
wherein said assigning includes utilizing said color information associated with the matching first pixel as color information for a respective pixel in said natural daylight color image corresponding to that second pixel.

13. The apparatus according to claim 12, wherein when executed said computer program further utilizes as said first pixels all of the pixels in said first image.

14. The apparatus according to claim 12, wherein when executed said computer program further utilizes as said color information for each said portion of said second image a red value, a green value and a blue value.

15. The apparatus according to claim 12, wherein when executed said computer program, for each said second pixel, carries out said matching as a function of a luminance value for that second pixel and respective luminance values for each of said first pixels.

16. The apparatus according to claim 12, wherein when executed said computer program carries out said determining of said statistical value for each said second pixel in a manner that includes determining a standard deviation of luminance values for a plurality of said second pixels; and wherein when executed said computer program carries out said determining of said statistical value for each said first pixel in a manner that includes determining a standard deviation of luminance values for a plurality of said first pixels.

17. The apparatus according to claim 12, wherein when executed said computer program carries out said obtaining of said first and second images in a manner that includes configuring said first, and second images to be registered images.

18. The apparatus according to claim 10, wherein when executed said computer program displays said natural daylight color image of said source scene.

19. An apparatus comprising:
an infrared image detector that provides a monochromatic infrared source image of a source scene; and
a transformation section that transforms said monochromatic infrared source image into a natural daylight color image of said source scene as a function of reference information, the only information derived from said source scene and utilized in the transforming being said monochromatic infrared source image, wherein said transformation section is configured to:
access a pair of reference images of a reference scene, wherein said pair of reference images includes a monochromatic infrared reference image of said reference scene and a natural daylight color reference image of said reference scene, wherein pixels from said monochromatic infrared reference image are co-located with pixels from said natural daylight color reference image;
match luminance values from pixels in said monochromatic infrared source image to luminance values associated with pixels in said monochromatic infrared reference image; and
assign color values to said pixels in said monochromatic infrared source image from color values associated with said pixels in said natural daylight color reference image based on a mapping from said pixels in said natural daylight color reference image to pixels in said monochromatic infrared reference image and said matching between said pixels in said monochromatic infrared reference image to said pixels in said source image to generate said natural daylight color image of said source scene.

20. The apparatus according to claim 19, wherein said transformation section maintains as said reference information a plurality of statistical values that are each a statistical variance of luminance in the vicinity of a respective one of a plurality of first pixels from a first image that is said monochromatic infrared reference image of said, reference scene that is different, from but similar to said source scene, each of said statistical values having associated therewith color information from a portion of a second image corresponding to that first pixel where the second image corresponds to said first image and is said natural daylight color reference image of said reference scene;
wherein said source image from said infrared image detector includes a plurality of second pixels; and
wherein said transformation section carries out the transforming in a manner that includes for each said second pixel:
determining a respective statistical value that is a statistical variance of luminance in the vicinity of that second pixel;
wherein said matching includes matching that second pixel to one of said first pixels as a function of said statistical value for that second pixel and said statistical values for said first pixels; and
wherein said assigning includes utilizing said color information associated with the matching first pixel as color information for a respective pixel in said natural daylight color image corresponding to that second pixel.

21. The method according to claim 1, including acts of:
removing duplicate luminance values associated with pixels in said monochromatic infrared reference image, wherein said act of removing duplicate luminance values includes:
identifying duplicate pairs of values for luminance and standard deviation of luminance, each respective pair associated with two or more pixels in said monochromatic infrared reference image;
generating an average of color values from said color values of pixels in said natural daylight color reference image mapped to said two or more pixels;
assigning said average of said color values to one of said two or more pixels; and
deleting any remaining pixels of said two or more pixels.

* * * * *

UNITED STATES PATENT AND TRADEMARK OFFICE
CERTIFICATE OF CORRECTION

PATENT NO. : 8,432,433 B2  Page 1 of 1
APPLICATION NO. : 12/687379
DATED : April 30, 2013
INVENTOR(S) : Andrew James Gabura It is certified that error appears in the above-identified patent and that said Letters Patent is hereby corrected as shown below:

In the Claims:

In claim 1, column 6, line 46, please delete "__,__" (only occurrence in line).

In claim 10, column 8, line 8, please delete "__,__" (only occurrence in line).

In claim 10, column 8, line 11, please delete "__,__" (only occurrence in line).

In claim 12, column 8, line 57, "wherein" should be added following "claim 10".

In claim 12, column 8, line 60, please delete "__,__" (only occurrence in line).

In claim 17, column 9, line 44, please delete "__,__" (only occurrence in line).

In claim 20, column 10, line 24, please delete "__,__" (only occurrence in line).

In claim 20, column 10, line 25, please delete "__,__" (first occurrence in line).

Signed and Sealed this
Thirtieth Day of July, 2013

Teresa Stanek Rea
*Acting Director of the United States Patent and Trademark Office*